United States Patent
Wang et al.

(10) Patent No.: US 12,299,506 B1
(45) Date of Patent: May 13, 2025

(54) CONFIGURING A MESSAGE CARD

(71) Applicant: Beijing Zitiao Network Technology Co., Ltd., Beijing (CN)

(72) Inventors: Linlin Wang, Beijing (CN); Junxing Chen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/636,946

(22) Filed: Apr. 16, 2024

(30) Foreign Application Priority Data

Oct. 31, 2023 (CN) .......................... 202311433008.2

(51) Int. Cl.
- *G06F 3/048* (2013.01)
- *G06F 3/0481* (2022.01)
- *G06F 9/54* (2006.01)

(52) U.S. Cl.
CPC ............ G06F 9/541 (2013.01); G06F 3/0481 (2013.01)

(58) Field of Classification Search
CPC ................................ G06F 9/541; G06F 3/0481
See application file for complete search history.

(56) References Cited

U.S. PATENT DOCUMENTS 9,710,636 B1 * 7/2017 Redpath ........... G06K 19/07749

FOREIGN PATENT DOCUMENTS

| CN | 113330489 | | 8/2021 |
|----|-----------|---|--------|
| CN | 114168869 | | 3/2022 |
| CN | 114327349 | | 4/2022 |
| CN | 114500423 | | 5/2022 |
| CN | 115061765 | | 9/2022 |
| CN | 115061765 A | * | 9/2022 |
| CN | 115550295 | | 12/2022 |
| CN | 115934066 | | 4/2023 |
| CN | 116932098 A | * | 10/2023 |
| WO | WO 2023011296 | | 2/2023 |

OTHER PUBLICATIONS

International Search Report in International Appln. No. PCT/CN2024/087341, mailed on Jul. 18, 2024, 5 pages (with English translation).

* cited by examiner

*Primary Examiner* — Haoshian Shih (74) *Attorney, Agent, or Firm* — Fish & Richardson P.C.

(57) ABSTRACT

Embodiments of the disclosure relate to a method, apparatus, device and storage medium for configuring a message card. The method includes: obtaining configuration information for a digital assistant, the configuration information indicating at least one message card for the digital assistant and a data source corresponding to the at least one message card, the configuration information further indicating a mapping relationship between a first data field associated with the at least one message card and a second data field associated with the data source; and controlling the digital assistant to display a message card based on the configuration information. In this way, by configuring the mapping between the message card and the data source, embodiments of the present disclosure may improve the reusability of message cards.

20 Claims, 5 Drawing Sheets

CONFIGURING A MESSAGE CARD

CROSS-REFERENCE TO RELATED APPLICATIONS

The present application claims priority to Chinese Patent Application No. 202311433008.2, filed on Oct. 31, 2023, and entitled "Method, apparatus, device and storage medium for configuring a message card", the entirety of which is incorporated here by reference.

TECHNICAL FIELD

Embodiments of the present disclosure generally relate to the field of computers, and more particularly to configuring a message card.

BACKGROUND

With the development of computer technology, various types of digital assistants are widely used in various aspects of people's daily lives. For example, people may use a digital assistant to query information such as weather, traffic, etc.

In an interaction process with the digital assistant, a message card is an important content carrier that may present information intuitively through structured styles.

SUMMARY

In a first aspect of the present disclosure, a method of configuring a message card is provided. The method includes: obtaining configuration information for a digital assistant, the configuration information indicating at least one message card for the digital assistant and a data source corresponding to the at least one message card, the configuration information further indicating a mapping relationship between a first data field associated with the at least one message card and a second data field associated with the data source; and controlling the digital assistant to display a message card based on the configuration information.

In a second aspect of the present disclosure, an apparatus for configuring a message card is provided. The apparatus includes: an obtaining module configured to obtain configuration information for a digital assistant, the configuration information indicating at least one message card for the digital assistant and a data source corresponding to the at least one message card, the configuration information further indicating a mapping relationship between a first data field associated with the at least one message card and a second data field associated with the data source; and a controlling module configured to control the digital assistant to display a message card based on the configuration information.

In a third aspect of the present disclosure, an electronic device is provided. The device includes at least one processing unit; and at least one memory, at least one memory is coupled to the at least one processing unit and stores instructions for execution by the at least one processing unit. The instructions cause the device to perform operations that implement the method of the first aspect when executed by the at least one processing unit.

In a fourth aspect of the present disclosure, a computer-readable storage medium is provided. The computer-readable storage medium stores a computer program that can be executed by a processor to perform operations that implement the method of the first aspect.

It should be understood that the contents described in this section are not intended to limit the key features or important features of the present disclosure, nor are they intended to limit the scope of the disclosure. Other features of the disclosure will become readily understood from the following description.

BRIEF DESCRIPTION OF THE DRAWINGS

The above and other features, advantages and aspects of the various embodiments of the present disclosure will become more apparent in conjunction with the accompanying drawings and with reference to the following detailed description. In the drawings, same or similar reference numerals denote same or similar elements, where.

DETAILED DESCRIPTION

It can be understood that the user is informed of a type, an application range and an application scene of personal information in an appropriate manner, to obtain permission from the user before the technical solution according to the embodiments of the present disclosure is used.

For example, prompt information is sent to the user in response to a reception of an active request from the user, to explicitly inform the user that the requested operation may acquire and use personal information of the user. Therefore, the user may voluntarily choose whether to provide the personal information to software or hardware, such as an electronic device, an application, a server, or a storage medium, with which an operation is performed according to the technical solutions of the present disclosure.

As an optional but non-restrictive implementation, the prompt information may be sent to the user with a pop-up window, in response to the reception of the active request from the user. The prompt information may be presented as a text in the pop-up window. In addition, a selection control may be carried in the pop-up window, by which the user may select "agree" or "disagree" to provide personal information to the electronic device.

It can be understood that the above processes of informing the user and acquiring permission from the user is only illustrative, and the implementation of the present disclosure is not limited thereto. Other implementations that conform to the relevant laws and regulations may also be applied to the present disclosure.

It can be understood that the data involved in this technical solution (including but not limited to the data itself, data acquisition or use) should comply with the requirements of relevant laws and regulations and relevant provisions.

The term "in response to" used here refers to a state where a corresponding event occurs or a condition is satisfied. It will be understood that the timing of subsequent actions executed in response to the event or condition is not necessarily strongly related to the time when the event occurs or the condition is satisfied. For example, in some cases, subsequent actions may be executed immediately when the event occurs or the condition is satisfied; while in other cases, subsequent actions may be executed after a period of time after the event occurs or the condition is satisfied.

The following will describe embodiments of the present disclosure in more detail with reference to the accompanying drawings. Although certain embodiments of the present disclosure are shown in the drawings, it should be understood that the present disclosure can be implemented in various forms and should not be construed as limited to the embodiments set forth herein. On the contrary, these embodiments are provided for a more thorough and complete understanding of the present disclosure. It should be understood that the accompanying drawings and embodiments of the present disclosure are for illustrative purposes only and are not intended to limit the scope of protection of the present disclosure.

It should be noted that the titles of any section/sub-section provided herein are not restrictive. Various embodiments are described herein, and any type of embodiment can be included under any section/sub-section. In addition, the embodiments described in any section/sub-section can be combined in any way with any other embodiments described in the same section/sub-section and/or different sections/sub-sections.

In the description of embodiments of the present disclosure, the term "include" and similar terms should be understood as open-ended inclusion, that is, "include but not limited to". The term "based on" should be understood as "at least partially based on". The term "one embodiment" or "the embodiment" should be understood as "at least one embodiment". The term "some embodiments" should be understood as "at least some embodiments". The following text may also include other explicit and implicit definitions. The terms "first", "second", etc. may refer to different or identical objects. The following text may also include other explicit and implicit definitions.

As briefly mentioned earlier, in the interaction process with the digital assistant, a message card is an important content carrier that may present information intuitively through structured styles.

However, traditional solutions require developers to write a corresponding message card for specific business content. For example, although some cards have similar styles, developers need to write corresponding message cards multiple times based on different business content. This greatly increases the time cost for developers.

Therefore, embodiments of the present disclosure provide a solution for configuring a message card. According to various embodiments of the present disclosure, configuration information for a digital assistant may be obtained. The configuration information indicates at least one message card for the digital assistant and a data source corresponding to the at least one message card. The configuration information further indicates a mapping relationship between a first data field associated with the at least one message card and a second data field associated with the data source; and controlling the digital assistant to display a message card based on the configuration information.

In this way, by configuring the mapping between the message card and the data source, embodiments of the present disclosure may improve the reusability of message cards. For example, the same message card style can be associated with the display of different types of business messages based on different mapping relationships.

In the following, example embodiments of the present disclosure may be described with reference to the accompanying drawings.

Example Environment

Figure 1:
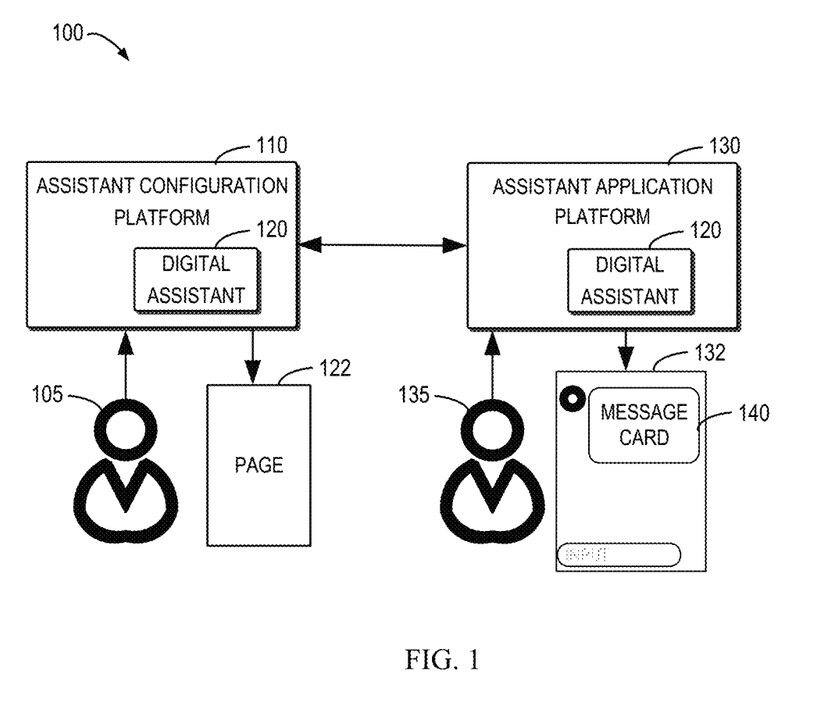
FIG. 1 illustrates a schematic diagram of an example environment.

FIG. 1 illustrates a schematic diagram of an example environment 100 in which embodiments of the present disclosure may be implemented. Environment 100 involves an assistant configuration platform 110 and an assistant application platform 130.

As shown in FIG. 1, the assistant configuration platform 110 may provide a creation, configuration, and publishing environment of a digital assistant for the user 105. In some embodiments, the assistant configuration platform 110 may be a low-code platform that provides a collection of tools for digital assistant creation. The assistant configuration platform 110 may support visual development of the digital assistant, allowing developers to skip the manual coding process and accelerate the development cycle and cost of applications. The assistant configuration platform 110 may support any suitable platform for users to develop digital assistants and other types of applications, such as platforms based on application platform as a service (aPaaS). Such platforms may support users to efficiently develop applications, achieve application creation, application function adjustment, and other operations.

The assistant configuration platform 110 may be deployed locally on the terminal device of the user 105 and/or may be supported by a remote server. For example, the terminal device of the user 105 may run a client (e.g., an application) in communication with the assistant configuration platform 110 and the client may support the user's interaction with the assistant configuration platform 110. In a case where the assistant configuration platform 110 runs locally on the user's terminal device, the user 105 may directly use the client to interact with the local assistant configuration platform 110. In a case where the assistant configuration platform 110 runs on a server end device, the server end device may provide services to the client running on the terminal device based on the communication connection between the assistant configuration platform 110 and the terminal device. The assistant configuration platform 110 may present a corresponding page 122 to the user 105 based on the operation of user 105 to output to the user 105 and/or receive information from the user 105.

In some embodiments, the assistant configuration platform 110 may be associated with a corresponding database that stores data or information required for the digital assistant creation process supported by the assistant configuration platform 110. For example, the database may store code and descriptive information corresponding to various functional modules that make up the digital assistant. The assistant configuration platform 110 may also perform operations such as calling, adding, deleting, updating and the like on the functional modules in the database. The database may also store operations that may be performed on different functional modules. In an example, in a scenario where a digital assistant is to be created, the assistant configuration platform 110 may call corresponding functional modules from the database to build the digital assistant.

In some embodiments of the present disclosure, the user 105 may create a digital assistant 120 on the assistant configuration platform 110 as needed and publish the digital assistant 120. The digital assistant 120 may be published to any suitable assistant application platform 130, as long as the assistant application platform 130 may support the operation of the digital assistant 120. After publication, the digital assistant 120 may be used for a conversational interaction with the user 135. The client of the assistant application platform 130 may present an interaction window 132 of the digital assistant 120 in the client interface, such as a session window. For example, the client may render a user interface in the terminal device for presenting the session window. The digital assistant 120, as an intelligent assistant, has intelligent conversation and information processing capabilities. The user 135 may enter a session message to the session window, and the digital assistant 120 may determine a reply message based on the created configuration information and present it to the user in the interaction window 132. In some embodiments, depending on the configuration of the digital assistant 120, the interaction message with the digital assistant 120 may include a message card 140 presented based on the configuration information obtained at the assistant configuration platform 110.

The assistant configuration platform 110 and/or the assistant application platform 130 may run on an appropriate electronic device. The electronic device may be any type of device that is capable of computing, including a terminal device or a server end device. The terminal device may be any type of mobile terminals, fixed terminals, or portable terminals, including mobile phones, desktop computers, laptop computers, notebook computers, netbook computers, tablet computers, media computers, multimedia tablets, personal communication system (PCS) devices, personal navigation devices, personal digital assistants (PDAs), audio/video players, digital cameras/camcorders, positioning devices, television receivers, radio broadcast receivers, electronic book devices, gaming devices, or any combination of the foregoing, including accessories and peripherals of these devices, or any combination thereof. Server end devices may include, for example, computing systems/servers, such as mainframes, edge computing nodes, computing devices in cloud environments and the like. In some embodiments, the assistant configuration platform 110 and/or the assistant application platform 130 may be implemented based on a cloud service.

It should be understood that the structure and function of the environment 100 are described for illustrative purposes only and do not imply any limitation on the scope of the present disclosure. For example, although FIG. 1 shows a single user interacting with the assistant configuration platform 110 and a single user interacting with the assistant application platform 130, but in fact, multiple users may access the assistant configuration platform 110 to each create a digital assistant respectively, and each digital assistant may be used to interact with multiple users.

The following will describe some example embodiments of the present disclosure in detail with reference to the accompanying drawings. It should be understood that the pages shown in the drawings are merely examples and various page designs may actually exist. The various graphic elements in the page may have different arrangements and visual representations, one or more of which may be omitted or replaced, and one or more other elements may also exist. Embodiments of the present disclosure are not limited in this aspect.

Example Process

Figure 2:
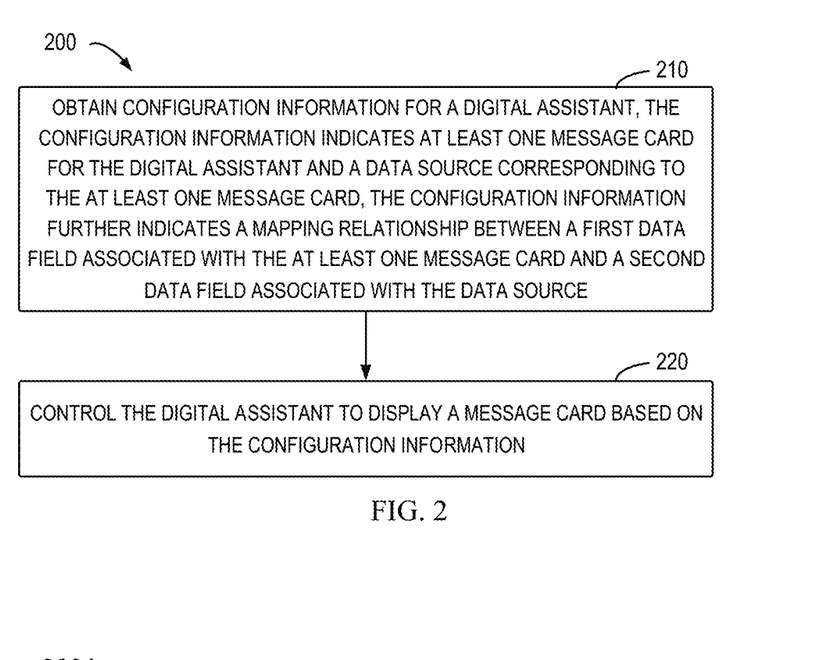
FIG. 2 illustrates a flowchart of an example process for configuring a message card.

FIG. 2 illustrates a flowchart of an example process 200 for configuring a message card according to some embodiments of the present disclosure. The process 200 may be implemented at the assistant configuration platform 110. The following may describe the process 200 with reference to FIG. 1.

As shown in FIG. 2, at block 210, the assistant configuration platform 110 obtains configuration information for the digital assistant 120. The configuration information indicates at least one message card for the digital assistant 120 and a data source corresponding to the at least one message card. The configuration information further indicates a mapping relationship between a first data field associated with the at least one message card and a second data field associated with the data source.

An example process of obtaining configuration information may be described with reference to FIGS. 3A to 3B. In some embodiments, as shown in FIG. 3A, the digital assistant 120 may be associated with, for example, multiple plug-ins for providing messages, such as a plug-in 310 and a plug-in 320.

The plugins 310 and 320, for example, may provide corresponding Application Programming Interfaces (APIs) for obtaining corresponding messages by calling the APIs by the digital assistant 120. For example, the digital assistant 120 may be associated with multiple APIs of the plug-in 310 (e.g., API 1 and API 2), and associated with API 3 of the plug-in 320. The APIs may also be referred to as the data source of the digital assistant 120.

Figure 3A:
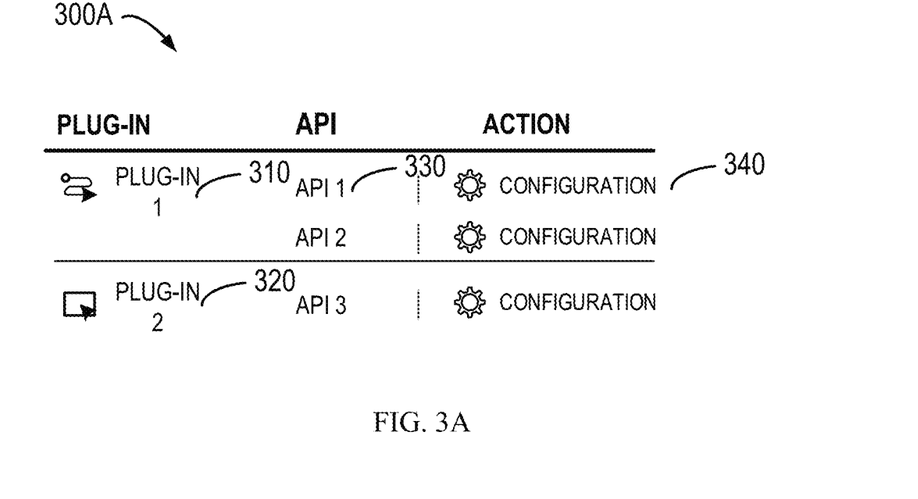
FIGS. 3A to 3C illustrate example interfaces.

Further, as shown in FIG. 3A, the assistant configuration platform 110 may present a set of APIs for a target plug-in (e.g., the plug-in 310) associated with the digital assistant 120 in the interface 300A, such as API 330.

In some embodiments, the assistant configuration platform 110 may present a card configuration interface for the target API based on a selection of a target API in the set of APIs. Taking FIG. 3A as an example, the assistant configuration platform 110 may be associated with the API 330 to provide a configuration entry 340. Upon receiving a selection of the configuration entry 340, the assistant configuration platform 110 may present a card configuration interface 300B as shown in FIG. 3B. In some embodiments, the assistant configuration platform 110 may establish an association between a target data source of the digital assistant and a target message card in a set of predetermined message cards based on the first configuration operation in the card configuration interface 300B.

Figure 3B:
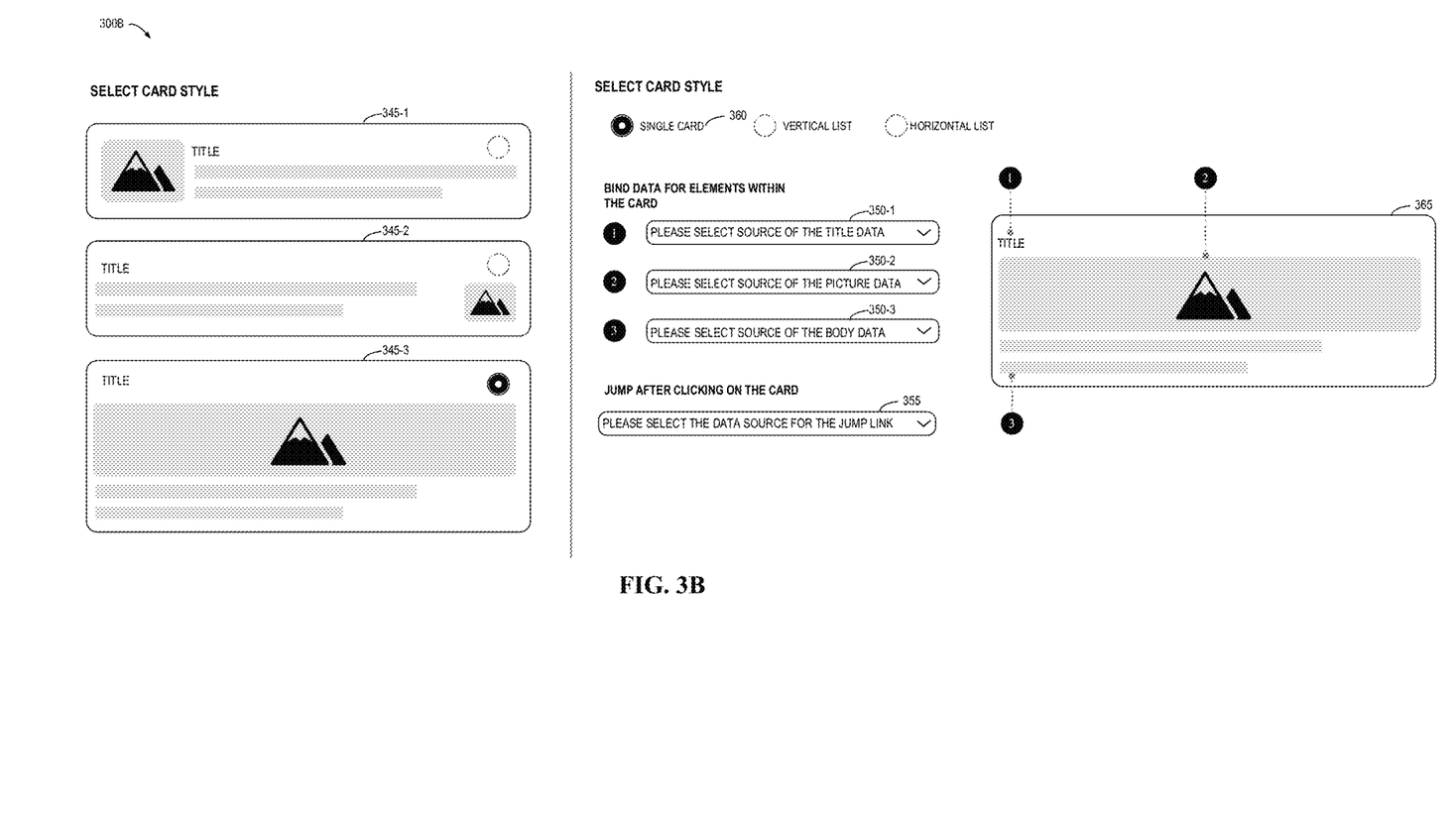

Specifically, as shown in FIG. 3B, the assistant configuration platform 110 may present a set of card templates for API 330 in the card configuration interface 300B, such as card templates 345-1, 345-2, and 345-3 (individually or collectively referred to as card template 345).

In some embodiments, such different card templates, for example, may have different card styles. The assistant configuration platform 110 may also present style information of the set of card template 345 in the card configuration interface 300B.

In some embodiments, the style information may represent a display style of the card template 345. In an example, the style information may indicate a layout of a set of display elements in a card template.

The set of display elements, for example, may include a title section, an image section, and a text section, which may correspond to a set of data fields associated with the card template, such as a title field, an image field, and a text field.

In some embodiments, such a card template 345 may be developed by a card developer and published to the assistant configuration platform 110, so that different types of applications in the assistant configuration platform 110 may share the same card style.

In this way, embodiments of the present disclosure may support the same card style for different digital assistants or different APIs to reuse, which may reduce the cost of card development and management.

In some embodiments, for example, the assistant configuration platform 110 may also support the configuration of the digital assistant 120 to create and publish new card styles.

In some embodiments, the assistant configuration platform 110 may receive a first configuration operation. The first configuration operation may indicate a selection of a target card template in a set of card templates. Taking FIG. 3B as an example, the assistant configuration platform 110 may receive a selection of the card template 345-3.

In some embodiments, the assistant configuration platform 110 may correspondingly establish an association between a data source (i.e., API 330) of the digital assistant 120 and a target card template (e.g., card template 345-3) in a predetermined set of card templates. Furthermore, the assistant configuration platform 110 may establish an association between API 330 and the target message card to be configured corresponding to card templates 345-3.

In some embodiments, the target card template (e.g., the card template 345-3) corresponding to the target message card may be associated with a first set of data fields. Taking FIG. 3B as an example, such a first set of fields may include, for example, the title field, picture field, and body field discussed above.

In some embodiments, the assistant configuration platform 110 may also establish a mapping between the first set of data fields and the second set of data fields based on the second configuration operation, where the target data source is associated with the second set of data fields.

In some embodiments, for different APIs of the plug-in, corresponding message structures may be defined. Taking API 330 as an example, the developer of the API 330 may specify the message structure of the message obtained through the API 330, that is, a set of data fields included in the message.

Furthermore, the assistant configuration platform 110, for example, may use the card configuration interface 300B to establish a mapping between the first set of data fields of the card template 345-3 and the second set of data fields of the API 330.

In some embodiments, the assistant configuration platform 110 may present a configuration control for the first data field of the first set of data fields in the card configuration interface 300B. Specifically, as shown in FIG. 3B, the assistant configuration platform 110 may present a configuration control 350-1 for the "title field", a configuration control 350-2 for the "picture field", and a configuration control 350-3 for the "body field". Configuration controls 350-1 to 350-3 may be individually or collectively referred to as configuration control 350.

Further, the assistant configuration platform 110 may receive the second configuration operation via the configuration control 350. The second configuration operation, for example, may indicate a selection of a second data field of the second set of data fields.

Taking FIG. 3B as an example, the assistant configuration platform 110, for example, may use the configuration control 350-1 to input the field corresponding to the "title field" in the message structure returned by API 330. For example, the assistant configuration platform 110 may present one or more data fields of the second set of data fields of API 330 by pulling down and expanding, and may receive a selection of the second data field of the one or more data fields.

In some embodiments, the configuration control 350 is configured to present at least one data field of the second set of data fields that matches the first data field. Continuing with the configuration control 350-1 as an example, for the "title field", its data type in the card template 345-3, for example, is of string type. Correspondingly, the configuration control 350 may present one or more data fields of the second set of data fields of the API 330 that are of string type or may be converted to string type as candidates.

In this way, embodiments of the present disclosure may further improve the efficiency of card configuration, to avoid possible errors caused by data type mismatch.

In some embodiments, the card configuration interface 300B, for example, may also receive other configuration items regarding the message card. For example, the assistant configuration platform 110 may determine, by the configuration control 360, the style of the message card, e.g., a single card, a vertical list, or a horizontal list.

In some embodiments, the assistant configuration platform 110 may also determine at least one interaction strategy associated with the target message card based on a third configuration operation. Continuing with FIG. 3B as an example, the assistant configuration platform 110, for example, may utilize the configuration control 355 to determine a jump strategy for the target message card, i.e., the page after the jump is specified, for example, in response to a user selection of a displayed message card.

In some embodiments, for example, the assistant configuration platform 110 may also support the definition of other types of interaction policies, such as click strategy, long press strategy, drag and drop strategy and the like.

In this way, embodiments of the present disclosure may support the developed card style to reuse by establishing a binding between the message card and the data source, which may greatly reduce the development cost of the message card.

Although the above describes the specific configuration interface with reference to FIGS. 3A to 3B, it should be understood that the assistant configuration platform 110, for example, may also obtain configuration information by another suitable interaction pattern to establish a mapping relationship between the first data field associated with the message card and the second data field associated with the data source.

In some embodiments, the assistant configuration platform 110 may provide a card preview page 365 based on the obtained configuration information. The card preview page, for example, may display a first message card corresponding to a first message, where the first message includes a predetermined message or a message from the data source.

In some embodiments, the assistant configuration platform 110 may provide a preview of the message card corresponding to such configuration information to facilitate perception of the message card corresponding to the configuration information. For example, the assistant configuration platform 110 may provide a debugging interface to support displaying the corresponding message card by obtaining real-time messages of corresponding data source. As another example, the assistant configuration platform 110 may also display the corresponding message card based on a sample message corresponding to the API.

In this way, some embodiments of the present disclosure may help the configuration side intuitively determine whether the input configuration information can obtain the message card that meets expectations, thereby facilitating the configuration side more efficiently complete the configuration of the message card.

In some embodiments, the assistant configuration platform 110 may also generate a data object corresponding to the at least one message card based on the obtained configuration information. In some embodiments, the data object indicates a second data field corresponding to the first data field of the message card, e.g., a specific data field of the message structure of API 330.

In some embodiments, the data object may further indicate an identification of the at least one message card, e.g., its style identification, template identification, etc. Alternatively, or in addition, the data object may further indicate a type of at least one message card. Alternatively, or in addition, the data object may further indicate a resource address of the at least one message card. Terminal devices may obtain the display resources of the message card template by accessing such resource addresses and may complete the display of the message card by filling the corresponding data into the template.

By establishing a data object of the message card, embodiments of the present disclosure may further improve the management efficiency of the message card available in the digital assistant.

Still referring to FIG. 2, at block 220, the assistant configuration platform 110 controls the digital assistant 120 to display a message card based on the configuration information.

Specifically, when the digital assistant obtains a second message from the configured data source, the assistant configuration platform 110 may control the digital assistant 120 to determine a second message card corresponding to the second message based on the configuration information.

Figure 3C:
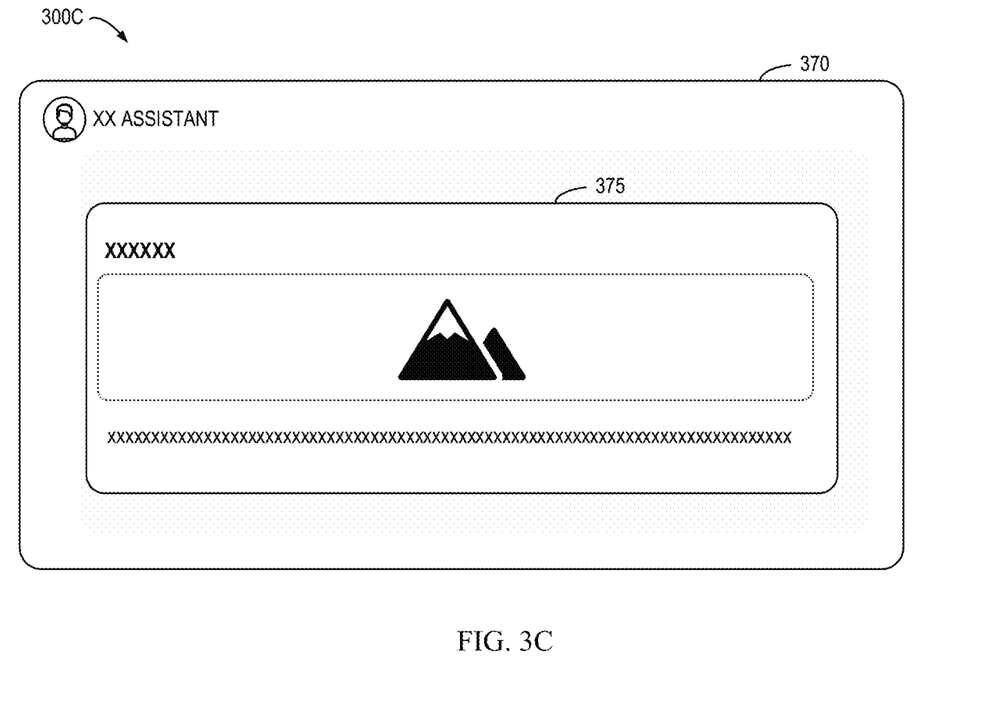

Taking FIG. 3C as an example, when the digital assistant 120 calls the API 330 to obtain a message to be provided to the user, the digital assistant 120 may determine, based on the configuration information of the message card, that the message may correspond to the second message card configured based on the card template 345-3.

Furthermore, the assistant configuration platform 110 may control the digital assistant 120 to determine the value of at least one data field of the second message card based on the second message and configuration information. In an example, the digital assistant 120 may determine a specific value of the data field of the second message card based on the data field mapping relationship indicated in the configuration information. Taking FIG. 3B as an example, if the "title field" in the second message card corresponds to a specific field in the message of API 330, the digital assistant 120 may determine the value of the "title field" based on the value of the specific field in the message obtained using API 330.

Further, the assistant configuration platform 110 may control the digital assistant 120 obtaining a display resource corresponding to the second message card. For example, the digital assistant 120 may obtain a corresponding display resource based on the resource address defined in the card object of the second message card.

In addition, the assistant configuration platform 110 may control the digital assistant 120 to display the second message card based on the display resource and the value of at least one data field. FIG. 3C illustrates an example interface 300C according to some embodiments of the present disclosure, where the digital assistant 120, for example, may display the message card 375 according to the display resource (e.g., the display resource of the template) and values of respective fields of the message card. Such a message card 375, for example, may be presented in a session window 370 of the digital assistant.

In this way, embodiments of the present disclosure may support the digital assistant 120 to dynamically determine whether to use a message card for display and determine which message card to be used for display based on the configuration information. Therefore, embodiments of the present disclosure may improve the processing efficiency of message cards in the interaction with the digital assistant.

Example Apparatus and Device

Figure 4:
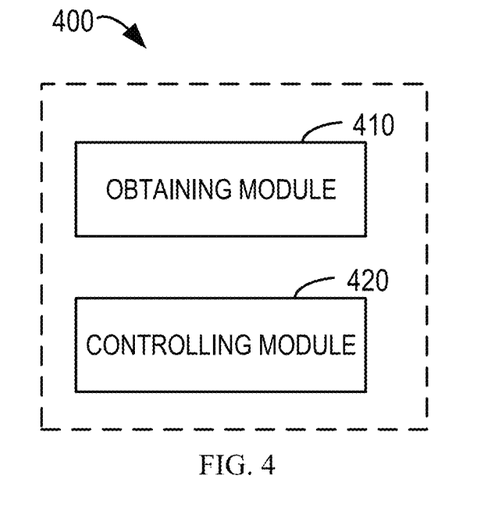
FIG. 4 illustrates a block diagram of an example apparatus for configuring a message card.

Embodiments of the present disclosure further provide a corresponding apparatus for implementing the above-mentioned methods or processes. FIG. 4 illustrates a schematic structural block diagram of an example apparatus 400 for configuring a message card in accordance with certain embodiments of the present disclosure. The apparatus 400 may be implemented as or included in the assistant configuration platform 110. Various modules/components in the apparatus 400 may be implemented by hardware, software, firmware, or any combination of them.

As shown in FIG. 4, the apparatus 400 includes an obtaining module 410 and a controlling module 420. The operating module 410 is configured to obtain configuration information for a digital assistant, the configuration information indicating at least one message card for the digital assistant and a data source corresponding to the at least one message card, the configuration information further indicating a mapping relationship between a first data field associated with the at least one message card and a second data field associated with the data source. The controlling module 420 is configured to control the digital assistant to display a message card based on the configuration information.

In some embodiments, the obtaining module 410 is further configured for: establishing, based on a first configuration operation, an association between a target data source of the digital assistant and a target message card in a set of predetermined message cards, wherein the target message card is associated with a first set of data fields and the target data source is associated with a second set of data fields; and establishing, based on a second configuration operation, a mapping between the first set of data fields and the second set of data fields.

In some embodiments, the obtaining module 410 is further configured for: presenting a set of application programming interfaces APIs for a target plug-in associated with the digital assistant, the set of APIs corresponding to a set of data sources of the digital assistant; presenting, based on a selection of a target API in the set of APIs, a card configuration interface for the target API, the target API corresponding to the target data source; and receiving the first configuration operation and/or the second configuration operation via the card configuration interface.

In some embodiments, the obtaining module 410 is further configured for: presenting a set of card templates for the target API in the card configuration interface; and receiving the first configuration operation, the first configuration operation indicating a selection of a target card template in the set of card templates, the target message card corresponding to the target card template.

In some embodiments, the obtaining module 410 is further configured for: presenting style information of the set of card templates in the card configuration interface.

In some embodiments, the style information indicates a layout of a set of display elements in a card template and the set of display elements correspond to a set of data fields associated with the card template.

In some embodiments, the obtaining module 410 is further configured for: presenting a configuration control for the first data field of the first set of data fields in the card configuration interface; and receiving the second configuration operation via the configuration control, the second configuration operation indicating a selection of the second data field of the second set of data fields.

In some embodiments, the configuration control is configured to present at least one data field of the second set of data fields that matches the first data field.

In some embodiments, the obtaining module 410 is further configured for: determining, based on a third configuration operation, at least one interaction strategy associated with the target message card.

In some embodiments, the obtaining module 410 is further configured for: providing a card preview page based on the configuration information, the card preview page displaying a first message card corresponding to a first message, the first message comprising a predetermined message or a message from the data source.

In some embodiments, the apparatus 400 further includes a generating module configured for: generating a data object corresponding to the at least one message card based on the configuration information, the data object indicating the second data field corresponding to the first data field.

In some embodiments, the data object further indicates at least one of the following information: an identification of the at least one message card; a type of the at least one message card; or a resource address of the at least one message card.

In some embodiments, the controlling module 420 is further configured for: responsive to the digital assistant obtaining a second message from the data source, controlling the digital assistant to determine a second message card corresponding to the second message based on the configuration information; controlling the digital assistant to determine a value of at least one data field of the second message card based on the second message and the configuration information; controlling the digital assistant to obtain a display resource corresponding to the second message card; and controlling the digital assistant to display the second message card based on the display resource and the value of at least one data field.

Figure 5:
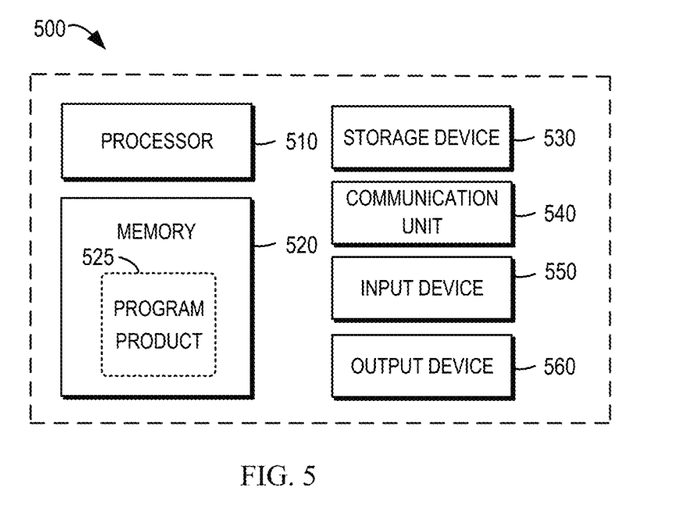
FIG. 5 illustrates a block diagram of an example electronic device.

FIG. 5 illustrates a block diagram of an example electronic device 500 in which one or more embodiments of the present disclosure may be implemented. it should be understood that the electronic device 500 shown in FIG. 5 is merely an example and should not constitute any limitation of the functionality and scope of the embodiments described herein. The electronic device 500 shown in FIG. 5 may be included in or implemented as the assistant configuration platform in FIG. 1.

As shown in FIG. 5, the electronic device 500 is in the form of a general purpose electronic device. The components of the electronic device 500 may include, but are not limited to, one or more processors or processing units 510, a memory 520, a storage device 530, one or more communication units 540, one or more input devices 550, and one or more output devices 560. The processing units 510 may be an actual or virtual processor and is capable of performing various processes based on the programs stored in memory 520. In a multiprocessor system, multiple processing units execute computer-executable instructions in parallel to enhance the parallel processing capability of the electronic device 500.

The electronic device 500 typically includes multiple computer storage media. Such media can be any available media that is accessible to the electronic device 500, including but not limited to volatile and non-volatile media, removable and non-removable media. The memory 520 may be a volatile memory (such as a register, cache, a random access memory (RAM)), a non-volatile memory (such as a read-only memory (ROM), electrically erasable programmable read-only memory (EEPROM), a flash memory), or any combination thereof. The storage device 530 may be removable or non-removable medium and may include machine-readable medium such as a flash drive, a disk, or any other medium that can be used to store information and/or data and can be accessed within electronic device 500.

The electronic device 500 may further include additional removable/non-removable, volatile/non-volatile storage medium. Although not shown in FIG. 5, a disk drive for reading from or writing to a removable, non-volatile disk (e.g., a "floppy disk") and an optical disk drive for reading from or writing to a removable, non-volatile optical disk may be provided. In these cases, each drive may be connected to a bus (not shown) by one or more data medium interfaces. The memory 520 may include a computer program product 525, which has one or more program modules configured to execute various methods or acts of various implementations of the present disclosure.

The communication unit 540 communicates with a further electronic device through the communication medium. In addition, functionality of components in the electronic device 500 may be implemented by a single computing cluster or multiple computing machines, which can communicate through a communication connection. Therefore, the electronic device 500 may be operated in a networking environment using a logical connection with one or more other servers, a network personal computer (PC), or another network node.

The input device 550 may be one or more input devices, such as a mouse, a keyboard, a trackball, etc. The output device 560 may be one or more output devices, such as a display, a speaker, a printer, etc. The electronic device 500 may also communicate with one or more external devices (not shown) through the communication unit 540 as required. The external device, such as a storage device, a display device, etc., communicate with one or more devices that enable users to interact with the electronic device 500, or communicate with any device (for example, a network card, a modem, etc.) that makes the electronic device 500 communicate with one or more other computing devices. Such communication may be executed via an input/output (I/O) interface (not shown).

According to the example implementations of the present disclosure, a computer-readable storage medium is provided, on which a computer-executable instruction or computer program is stored, wherein the computer-executable instructions are executed by the processor to implement the method described above. According to the example implementations of the present disclosure, a computer program product is also provided. The computer program product is physically stored on a non-transitory computer-readable medium and includes computer-executable instructions, which are executed by the processor to implement the method described above.

Various aspects of the present disclosure are described herein with reference to the flow chart and/or the block diagram of the method, the apparatus, the device and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, specialized computers, or other programmable data processing devices to produce a machine that generates an apparatus to implement the functions/actions specified in one or more blocks in the flow chart and/or the block diagram when these instructions are executed through the computer or other programmable data processing apparatuses. These computer-readable program instructions may also be stored in a computer-readable storage medium. These instructions enable a computer, a programmable data processing apparatus and/or other devices to work in a specific way. Therefore, the computer-readable medium containing the instructions includes a product, which includes instructions to perform operations to implement various aspects of the functions/actions specified in one or more blocks in the flowchart and/or the block diagram.

The computer-readable program instructions may be loaded onto a computer, other programmable data processing apparatus, or other devices, so that a series of operational steps may be executed on a computer, other programmable data processing apparatus, or other devices, to generate a computer-implemented process, such that the instructions which executed on a computer, other programmable data processing apparatuses, or other devices perform operations that implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a unit, a program segment or instructions, which contains one or more executable instructions for implementing the specified logic function. In some alternative implementations, the functions labeled in the block may also occur in a different order from those labeled in the drawings. For example, two consecutive blocks may actually be executed in parallel, and sometimes can also be executed in a reverse order, depending on the functionality involved. It should also be noted that each block in the block diagram and/or the flowchart, and combinations of blocks in the block diagram and/or the flowchart, may be implemented by a dedicated hardware-based system that executes the specified functions or acts, or by the combination of dedicated hardware and computer instructions.

Each implementation of the present disclosure has been described above. The above description is an example, not exhaustive, and is not limited to the disclosed implementations. Without departing from the scope and spirit of the described implementations, many modifications and changes are obvious to ordinary skill in the art. The selection of terms used in the present disclosure aims to best explain the principles, practical application or improvement of technology in the market of each implementation, or to enable others of ordinary skill in the art to understand the various implementations disclosed herein.

The invention claimed is:

1. A method of configuring a message card, comprising:
obtaining configuration information for a digital assistant, the configuration information indicating at least one message card for the digital assistant and a data source corresponding to the at least one message card, the configuration information further indicating a mapping relationship between a first data field associated with the at least one message card and a second data field associated with the data source; and
controlling the digital assistant to display a message card based on the configuration information, wherein obtaining configuration information for the digital assistant comprises:
establishing, based on a first configuration operation, an association between a target data source of the digital assistant and a target message card of a set of predetermined message cards, wherein the target message card is associated with a first set of data fields and the target data source is associated with a second set of data fields.

2. The method of claim 1, wherein obtaining configuration information for the digital assistant comprises:
establishing, based on a second configuration operation, a mapping between the first set of data fields and the second set of data fields.

3. The method of claim 2, further comprising:
presenting a set of application programming interfaces (APIs) for a target plug-in associated with the digital assistant, the set of APIs corresponding to a set of data sources of the digital assistant;
presenting, based on a selection of a target API in the set of APIs, a card configuration interface for the target API, the target API corresponding to the target data source; and
receiving one or more of the first configuration operation or the second configuration operation via the card configuration interface.

4. The method of claim 3, wherein receiving the first configuration operation via the card configuration interface comprises:
presenting a set of card templates for the target API in the card configuration interface; and
receiving the first configuration operation, the first configuration operation indicating a selection of a target card template in the set of card templates, the target message card corresponding to the target card template.

5. The method of claim 4, further comprising:
presenting style information of the set of card templates in the card configuration interface.

6. The method of claim 5, wherein the style information indicates a layout of a set of display elements in a card template and wherein the set of display elements correspond to a set of data fields associated with the card template.

7. The method of claim 3, wherein receiving the second configuration operation via the card configuration interface comprises:
presenting a configuration control for the first data field of the first set of data fields in the card configuration interface; and
receiving the second configuration operation via the configuration control, the second configuration operation indicating a selection of the second data field of the second set of data fields.

8. The method of claim 7, wherein the configuration control is configured to present at least one data field of the second set of data fields that matches the first data field.

9. The method of claim 2, further comprising:
determining, based on a third configuration operation, at least one interaction strategy associated with the target message card.

10. The method of claim 1, further comprising:
providing a card preview page based on the configuration information, the card preview page displaying a first message card corresponding to a first message, the first message comprising a predetermined message or a message from the data source.

11. The method of claim 1, further comprising:
generating a data object corresponding to the at least one message card based on the configuration information, the data object indicating the second data field corresponding to the first data field.

12. The method of claim 11, wherein the data object further indicates at least one of:
an identification of the at least one message card;
a type of the at least one message card; or
a resource address of the at least one message card.

13. The method of claim 1, wherein controlling the digital assistant to display a message card based on the configuration information comprises:
responsive to the digital assistant obtaining a second message from the data source, controlling the digital assistant to determine a second message card corresponding to the second message based on the configuration information;
controlling the digital assistant to determine a value of at least one data field of the second message card based on the second message and the configuration information;
controlling the digital assistant to obtain a display resource corresponding to the second message card; and
controlling the digital assistant to display the second message card based on the display resource and the value of at least one data field.

14. An electronic device, comprising:
at least one processing unit; and
at least one memory, the at least one memory being coupled to the at least one processing unit and storing an instruction for execution by the at least one processing unit, the instruction, when executed by the at least one processing unit, causing the electronic device to perform operations comprising:
obtaining configuration information for a digital assistant, the configuration information indicating at least one message card for the digital assistant and a data source corresponding to the at least one message card, the configuration information further indicating a mapping relationship between a first data field associated with the at least one message card and a second data field associated with the data source; and
controlling the digital assistant to display a message card based on the configuration information, wherein obtaining configuration information for the digital assistant comprises:
establishing, based on a first configuration operation, an association between a target data source of the digital assistant and a target message card of a set of predetermined message cards, wherein the target message card is associated with a first set of data fields and the target data source is associated with a second set of data fields.

15. The electronic device of claim 14, wherein obtaining configuration information for the digital assistant comprises:
establishing, based on a second configuration operation, a mapping between the first set of data fields and the second set of data fields.

16. The electronic device of claim 15, the operations further comprising:
presenting a set of application programming interfaces (APIs) for a target plug-in associated with the digital assistant, the set of APIs corresponding to a set of data sources of the digital assistant;
presenting, based on a selection of a target API in the set of APIs, a card configuration interface for the target API, the target API corresponding to the target data source; and
receiving one or more of the first configuration operation or the second configuration operation via the card configuration interface.

17. The electronic device of claim 16, wherein receiving the first configuration operation via the card configuration interface comprises:
presenting a set of card templates for the target API in the card configuration interface; and
receiving the first configuration operation, the first configuration operation indicating a selection of a target card template in the set of card templates, the target message card corresponding to the target card template.

18. The electronic device of claim 17, the operations further comprising:
presenting style information of the set of card templates in the card configuration interface.

19. The electronic device of claim 18, wherein the style information indicates a layout of a set of display elements in a card template and wherein the set of display elements correspond to a set of data fields associated with the card template.

20. A non-transitory computer readable storage medium, storing a computer program thereon, the computer program being executable by a processor to perform operations comprising:
obtaining configuration information for a digital assistant, the configuration information indicating at least one message card for the digital assistant and a data source corresponding to the at least one message card, the configuration information further indicating a mapping relationship between a first data field associated with the at least one message card and a second data field associated with the data source; and
controlling the digital assistant to display a message card based on the configuration information, wherein obtaining configuration information for the digital assistant comprises:
establishing, based on a first configuration operation, an association between a target data source of the digital assistant and a target message card of a set of predetermined message cards, wherein the target message card is associated with a first set of data fields and the target data source is associated with a second set of data fields.

* * * * *